US006425950B1

(12) United States Patent
Leitsch

(10) Patent No.: US 6,425,950 B1
(45) Date of Patent: Jul. 30, 2002

(54) METHOD FOR PRODUCING FOAMING SUBSTANCES, ESPECIALLY FOAMING CEMENT SUBSTANCES, AND CORRESPONDING DEVICE

(76) Inventor: Ferdinand Leitsch, Ausserhalb 5, D-55411 Bingen (DE)

( * ) Notice: Subject to any disclaimer, the term of this patent is extended or adjusted under 35 U.S.C. 154(b) by 0 days.

(21) Appl. No.: 09/623,089

(22) PCT Filed: Feb. 26, 1999

(86) PCT No.: PCT/DE99/00520

§ 371 (c)(1), (2), (4) Date: Oct. 16, 2000

(87) PCT Pub. No.: WO99/43478

PCT Pub. Date: Sep. 2, 1999

(30) Foreign Application Priority Data

Feb. 27, 1998 (DE) ........................................ 198 08 506

(51) Int. Cl.[7] ................................................ C04B 12/00

(52) U.S. Cl. ....................... 106/672; 106/820; 239/142; 239/144; 239/302; 239/303; 239/398

(58) Field of Search ................................ 239/142, 144, 239/302, 303, 398; 106/820, 672

(56) References Cited

U.S. PATENT DOCUMENTS

| | | | |
|---|---|---|---|
| 2,733,053 | A | 1/1956 | Dugas |
| 4,764,019 | A | 8/1988 | Kaminski et al. |
| 5,556,033 | A | 9/1996 | Nachtman |

FOREIGN PATENT DOCUMENTS

| | | |
|---|---|---|
| DE | 23 48 915 | 4/1975 |
| DE | 31 00 443 | 8/1982 |
| DE | 31 32 667 | 2/1983 |
| DE | 32 22 033 | 12/1983 |
| DE | 36 31 223 | 4/1988 |
| DE | 41 18 537 | 7/1992 |
| JP | 06144953 | 5/1994 |

*Primary Examiner*—Paul Marcantoni
(74) *Attorney, Agent, or Firm*—Venable; Gabor J. Kelemen; Catherine M. Voorhees

(57) ABSTRACT

The invention relates to a method for producing foaming substances, especially foaming cement substances, consisting essentially of a starting product, especially cement paste, and a foaming agent. The inventive substances are produced in a mixing reactor which is connected to a supply container for the starting product by a feed pump. A product flow taken from the mixing reactor is conveyed to the supply container in a circuit, the foaming agent and atmospheric air being added and the supply container being kept at a minimum level. After a mixing phase, a sub-flow is taken from the product flow for processing.

20 Claims, 2 Drawing Sheets

METHOD FOR PRODUCING FOAMING SUBSTANCES, ESPECIALLY FOAMING CEMENT SUBSTANCES, AND CORRESPONDING DEVICE

BACKGROUND OF THE INVENTION

The invention relates to a method of making foam materials, particularly foam cement materials which essentially consist of a starting product, particularly cement paste and a foaming agent. The method is performed in a mixing reactor which is coupled to a storage container by means of a delivery pump. The invention further relates to an apparatus for performing the method.

Foam materials or foam cement materials are frequently used in current construction technology, particularly in the renovation of old buildings, as well as in the construction of new buildings. When constructing walk-on floors, floor pavements, etc., for completing the floor structure, as a rule a leveling structure has to be applied to the raw floor to compensate for height differences, depressions, hollow spaces and the like. Such a compensation is effected generally by installing foamed plates and/or by using dampening material in loose bulk form. These known leveling methods are very work-intensive and are thus expensive. Further, such methods are questionable from the point of view of health conditions in the working environment.

The making of such a foam material in which instead of cement another binder is used, or the making of a foam cement material involves the production of a foam obtained by mixing air, water and a foaming agent. The foam is advanced to a mixing apparatus situated at the location of utilization and introduced into a cement paste consisting of cement and water. Such a manufacturing method is adapted almost exclusively for making a so-called heavy foam having a foam density in excess of 800 kg/m$^3$.

DE 41 18 537 C1 discloses a method of making a so-called light foam having a foam density between 250 and 400 kg/m$^3$ as well as an apparatus for performing the method. In this arrangement cement paste is injected under high pressure into a mixing chamber and mixed with a foaming agent. The mixture is, by virtue of the high pressure, admitted to an expansion nozzle into which metered pressurized air is blown for causing foaming.

Further, DE 36 31 223 A1 shows an apparatus for making a hardening foam mass having a fine pore structure, particularly a cement foam material which is introduced into a pipe and is forcibly conveyed and forcibly mixed by conveying and mixing tools disposed in the pipe. The foam material consisting of water and a foam-forming agent is added from the outside and distributed by the transporting path formed by the pipe. In this manner the water proportion of the foam material, which has a negative effect on the hardening, is intended to be reduced.

Further, DE 32 22 033 A1 describes a method of making, by using pressurized air, a porous mortar having a low specific weight. For performing the method, an apparatus is used which has apertured sheet metal components that are arranged behind one another in a pipe conduit. The mortar flows through the sheet metal components. By means of suitable couplings the pressurized air is introduced into the pipe, where the air mixes with the mortar.

Further, DE-A-23 48 915 discloses an apparatus for making foam cement with respective volumetric pumps for delivering water, foaming agent, air and cement paste or mortar. The pumps for water, foaming agent and air are connected with a foam-forming centrifuge coupled to a collector into which the cement or the mortar is conveyed. The mixture is transported from the collector to a mixing machine at the location of utilization.

The known apparatuses and processes are disadvantageous in that the consistency and thus the quality of the foam materials or foam cement materials changes due to the large number of serially arranged mixing and conveying units. Further, the known apparatuses are adapted only for the making of foam materials in a substantially limited density range and are very complex as a great number of auxiliary aggregates are being used.

From U.S. Pat. No. 5,556,033 an apparatus for making a sprayable foam material for a weather resistant protective coating is known which serves for covering a refuse dump (garbage deposit). The apparatus comprises a storage container in which a stirring device is arranged which is connected with a mixer. For conveying the foam material, the storage container is coupled with a pump which transports the mixture to a regulating valve. From the regulating valve an outlet leads to an injection device which is connected, on the one hand, to the storage container by a pipe conduit and, on the other hand, to a foam generator by an inlet channel. The foam generator includes a foaming agent tank which is connected with an injection device. The injection device, for producing a foam, is connected with a compressor for generating pressurized air. The foam made with pressurized air is admitted to the injection device via a nozzle and is introduced through the pipe conduit into the storage container in which the foam is mixed by means of the stirring device while a slurry is formed which, again, is conveyed to the regulating valve by the pump. From the regulating valve a partial stream is withdrawn through a pipe conduit having a coupled jet nozzle, and a product stream is again conveyed to the injection device in which foam is added to the product stream. Thereafter the product stream is again admitted to the storage container through the pipe conduit.

DE-A-31 32 667 discloses a method and an apparatus for making pore or foam concrete or the like, in which a foaming agent, water and pressurized air are combined in metered quantities for making a foam to be mixed with a starting product. The admission of the foaming agent is controlled by the inflowing water. For performing the method, the water inlet is constituted by a jet pump for the liquid foaming agent whose inlet merges directly in the nozzle of the jet pump. In the further course the admission of pressurized air is effected for the preparation of the foaming agent which is subsequently admitted, by means of a foam lance, in a mixing vessel where the already-produced foam is mixed with the starting product.

From U.S. Pat. No. 2,733,053 a mixing machine for making a foam cement material is known. The principle of the machine is based on that a solid material is agitated in a mixing reactor and mixed with various components. A revolving stirring device is arranged in the mixing reactor. For the storage of the components a water tank 16 and a cement tank 20 are provided.

SUMMARY OF THE INVENTION

It is the object of the invention to provide a method for making foam materials, particularly foam cement materials of the above-described kind and an apparatus for performing the method which find use at the location of utilization and which ensure a high quality of the manufactured foam materials.

As concerns the process, the object is achieved according to the invention in that a product stream taken from the mixing reactor is, while adding the foaming agent and ambient air, introduced in a circulating flow via jet pump into the storage container which is maintained at a minimum fill level, and, subsequent to an admixing phase, a partial stream for utilization is withdrawn from the product stream and the foaming agent is mixed to the product stream in the jet pump.

The product stream which continuously flows through the mixing reactor and which consists essentially of the starting product held in the storage container, the foaming agent and ambient air, is mixed with the starting product in an empirically determined admixing phase until a homogeneous foam material of high quality is obtained. As the product stream has reached a homogeneous consistency, the admixing phase is terminated and a partial stream is withdrawn for utilization from the product stream. Even after the admixing phase the product stream is passed through the mixing reactor in a circulating flow, whereby the high quality of the product stream and thus the quality of the partial stream to be utilized is preserved. The starting product, for example, cement paste is transported with a mobile mixer to the storage container at the location of utilization. The transport capacity of the mobile mixer is not reduced by the foaming agent, because the latter is made available separately.

Particularly for manufacturing a foam material having a low density, further additives are required apart from the foaming agent. Expediently, a pressurized gas is admixed to the product stream. For ensuring an intensive mixing of the product stream with the ambient air, the product stream is advanced into the storage container by means of a jet pump. Furthermore, by mixing the foaming agent to the product stream in the jet pump, soiling during the manufacture of the foam material is significantly reduced.

According to an advantageous feature of the invention the pressurized gas is admixed to the product stream in the jet pump. In this manner an excessive dust generation or a soiling during manufacture of the foam material is significantly reduced, and working environment-related health considerations which would be a factor when substantial dust is generated, may be eliminated to the largest possible extent.

Expediently, the quantity of the foaming agent admixed to the product stream and/or the pressurized gas is measured and regulated. This measure permits the setting of the foam material to a desired density which is required for utilization. Further, expediently the foaming agent and/or the pressurized gas is advanced to the jet pump by a metering pump through a flow rate meter.

According to a further feature of the invention the partial stream passes through a continuously operating density measuring device which serves for monitoring the quality of the partial stream.

Preferably, the density of the partial stream is volumetrically or gravimetrically determined. Further, the partial stream is supplied to the location of utilization or the storage container dependent on the result of the density measurement. A partial stream which does not satisfy quality requirements is not released for utilization, but is treated anew together with the product stream.

As concerns the structural aspects, the object is achieved according to the invention with the following features in an apparatus, particularly for performing the inventive method for making foam materials, particularly foam cement materials essentially consisting of a starting product, particularly cement paste and a foaming agent, wherein the apparatus includes a mixing reactor connected via a delivery pump with a storage container for the starting product. The mixing reactor has an outlet for a product stream, leading to a jet pump, an outlet for a partial stream of the product stream, leading to a location of utilization and an inlet for the product stream from the storage container. The product stream exits the jet pump above the fill level of the storage container. The jet pump is provided with an inlet for the foaming agent. At least one static mixing element is provided in the mixing reactor. The jet pump is provided with an inlet for the foaming agent. At least one static mixing element is provided in the mixing reactor.

Based on these measures the mixing reactor has a relatively compact structure and may be positioned in the immediate vicinity of the location of utilization. By virtue of the fact that the mixing reactor has a separate outlet and an inlet for the product stream as well as an outlet for the partial stream of the product stream, a separate circulation of these streams is feasible. A partial stream, guided to the location of utilization is taken from the product stream only when the product stream has the required quality. By virtue of the exit of the product stream from the jet pump above the fill level of the storage container a homogeneous mixing is achieved which contributes to the quality improvement of the foam material.

Expediently, within the mixing reactor at least one mixing element is disposed. The mixing element effects a swirling of the product stream and thus produces a uniform mass in the mixing reactor.

Preferably, at least one fine protective screen is installed within the mixing reactor. The fine protective screen is expediently disposed ahead of the product stream outlet, and the product stream outlet is located at a side of the mixing reactor which is opposite the product stream inlet. Based on this measure larger particles of the product stream are retained in the mixing reactor, and the jet pump is protected from being damaged by such particles.

To intensify the mixing of the product stream in the mixing reactor, according to an advantageous feature of the invention the mixing reactor is connected to an external vibrator. The vibrator has to be set in such a manner that an already-produced foam structure of the foam material is not damaged, so that a uniform and finely distributed air-pore structure is preserved in the foam material. Since the vibrations of the mixing reactor should not be transmitted to the storage container in their full extent, expediently the mixing reactor is connected with the storage container by a pipe conduit and a hose, between which the delivery pump is connected.

To obtain a thorough admixing of the product stream with the utilization of an existing conveying path, the pipe conduit is preferably provided with at least one mixing element.

According to a further advantageous feature of the invention the jet pump is provided with an inlet for the pressurized gas. The pressurized gas 13 introduced by this measure directly into the jet pump or, as the case may be, into the product stream flowing through the jet pump, and a soiling by products exiting in an uncontrolled manner is excluded to the greatest extent.

For making a foam material having a defined, regulatable density, the jet pump is preferably associated with a respective metering pump for supplying the foaming agent and/or the pressurized gas passing through a flow rate meter.

To ensure a continuous or random verification of the partial stream density, expediently a coupling conduit with an interconnected density measuring device is associated with the outlet for the partial stream of the product stream. Further, for monitoring the outputted partial stream quantity, at the location of utilization the coupling conduit is provided with a quantity measuring device connected after the density measuring device.

Since a partial stream which does not have the predetermined properties should not be admitted for utilization, the density measuring device is connected with a return conduit which leads to the storage container. In this manner such a partial stream is introduced into the starting product or, as the case may be, into the product stream and is treated anew.

To prevent introduction of coarse particles into the apparatus, the storage container is preferably covered by a protective screen.

According to an alternative feature of the invention, with the jet pump for the product stream a metering jet pump for a partial product stream is associated which advances the foaming agent and/or the pressurized gas to the partial product stream, and then the partial product stream is introduced into the mixing reactor. Based on this measure a definite density of the partial product stream is set. After admixing the partial product stream with the product stream in the mixing reactor, a density required for utilization will result.

It is to be understood that the features described above and to be further detailed below may be used not only in the given combination, but also in other combinations without departing from the scope of the present invention.

BRIEF DESCRIPTION OF THE DRAWINGS

The invention will be described in more detail in conjunction with an embodiment, with reference to the respective drawings.

DETAILED DESCRIPTION OF THE INVENTION

Figure 1:
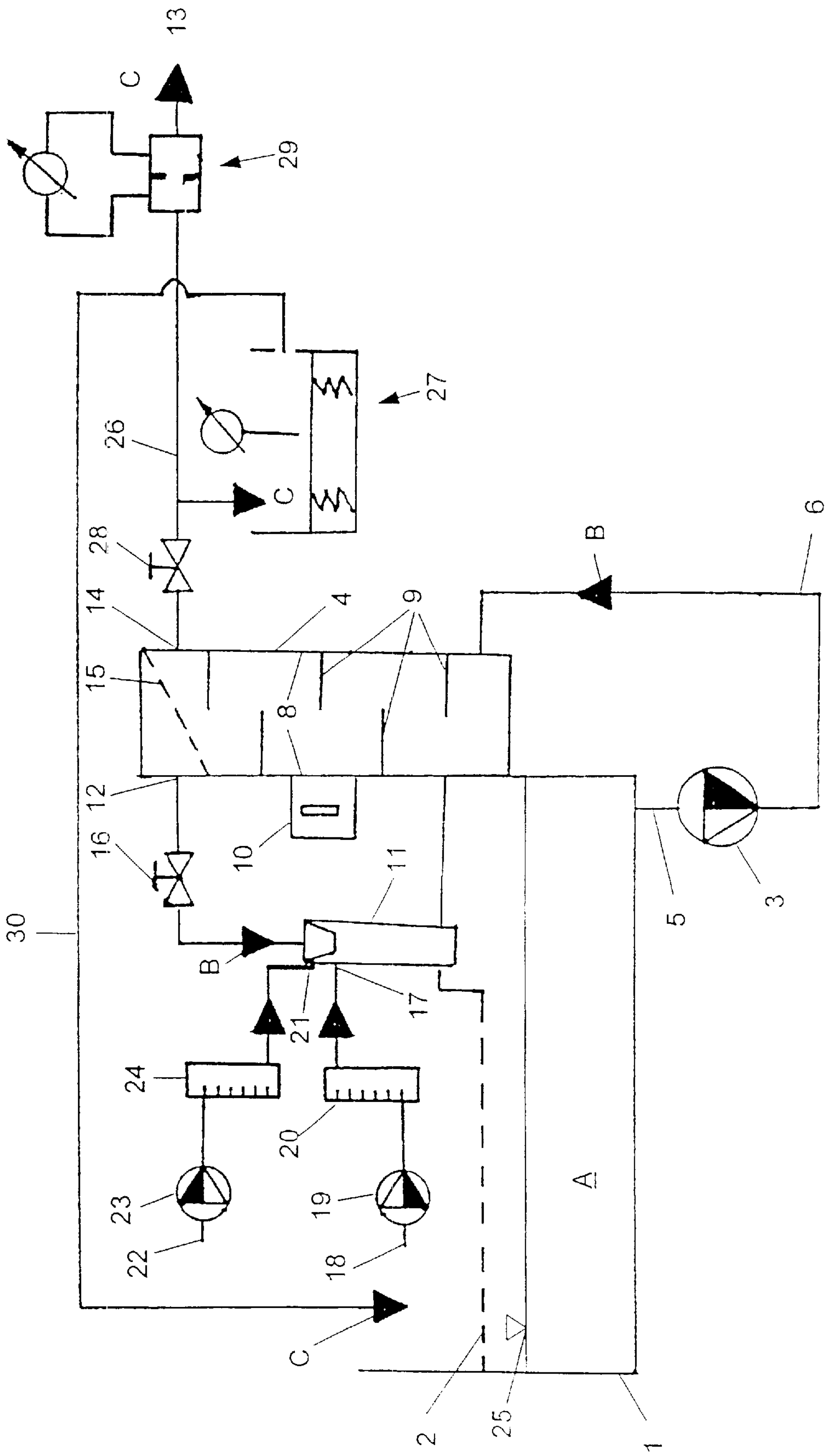
FIG. 1 shows a schematic illustration of an apparatus according to the invention and FIG. 2 shows a schematic illustration of a part of the apparatus according to the invention in an alternative arrangement.

The apparatus for making a foam material essentially includes, according to FIG. 1, a storage container 1 which receives a starting product A and which is covered by a protective screen 2 and is further coupled with a mixing reactor 4 by means of a delivery pump 3. The delivery pump 3 is connected by a hose 5 with the storage container 1, on the one hand, and by a pipe conduit 6 to an inlet 7 of the mixing reactor 4 for a product stream B, on the other hand. The inner wall of the pipe conduit 6 is provided with non-illustrated mixing elements.

The mixing reactor 4 carries mixing elements 9 at its inner walls 8 and is connected with an external vibrator 10. At the side opposite the inlet 7 for the product stream B the mixing reactor 4 has an outlet 12 for the product stream B, leading to a jet pump 11 as well as an outlet 14 for a partial stream C of the product stream B leading to a location of utilization 13. Ahead of the outlet 12 a fine protective screen 15 is installed which prevents passage of coarse particles. Further, between the outlet 12 and the jet pump 11 a shutoff valve 16 is arranged.

At its suction side the jet pump 11 is provided with an inlet 17 for a foaming agent 18 which is mixed to the product stream B by a metering pump 19 having an after-connected flow rate meter 20. Further, the jet pump 11 has an inlet 21 for a pressurized gas 22 which too, is introduced into the product stream B by a metering pump 23 having a flow rate meter 24. The jet pump 11 is arranged such that the product stream B is introduced into the storage container 1 above the fill level 25 of the starting product A.

The partial stream C of the product stream B is advanced to a density measuring device 27 having a pre-connected shutoff valve 28. Dependent upon the measuring result of the density measuring device 27, the partial stream C reaches either the location of utilization 13 via a quantity measuring device 29 or the storage container 1 via a return conduit 30.

Figure 2:
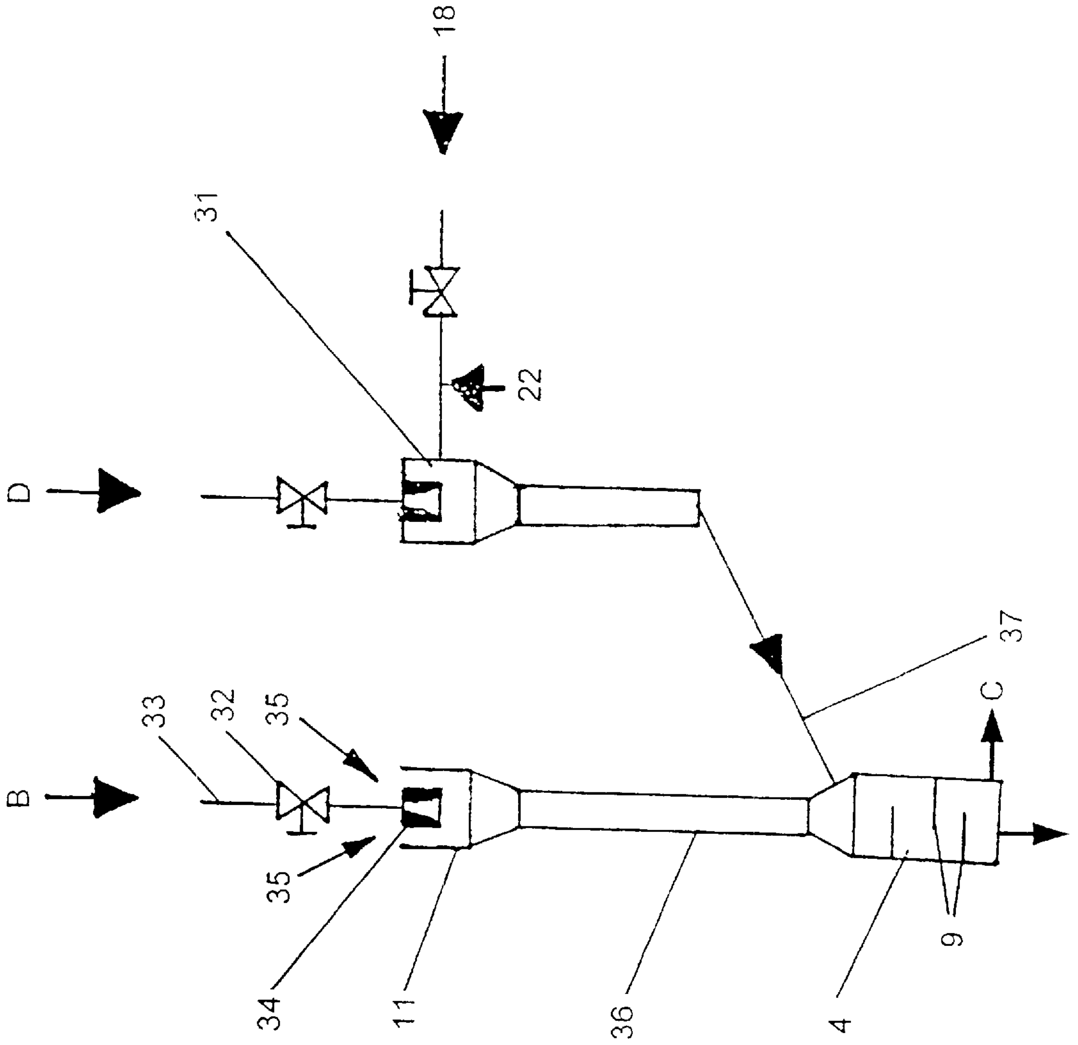

According to FIG. 2 a metering jet pump 31 for a partial product stream D is associated with the jet pump 11 for the product stream B. The product stream B reaches a drive nozzle 34 via a supply conduit 33 provided with a shutoff valve 32. At this location a mixing of the product stream B with air or a gas 35 takes place which is introduced into the jet pump 11 in an open manner. A diffusor 36, connected after the jet pump 11, merges into the mixing reactor 4.

The partial product stream D is thoroughly mixed in the metering jet pump 31 with the foaming agent 18 and the pressurized gas 35, and subsequently the partial product stream D too, is admitted to the mixing reactor 4 via an inlet 37.

From the mixing reactor 4 again a product stream B is guided into the storage container 1 and a partial stream C is guided to the location of utilization 13.

For performing the method, the starting product A, consisting of cement and water, is delivered by means of a mobile mixer and is introduced into the storage container 1 through the protective screen 2. In a mixing phase of the product stream B the shutoff valve 28 for the partial stream C is closed, and while the foaming agent 18, pressurized gas 22 and ambient air are added, the product stream B is pumped and thus mixed in a circulating flow. In this proceeding the product stream B is withdrawn from the storage container 1 by the delivery pump 3, advanced to the mixing reactor 4 through the pipe conduit 6 provided with mixing elements and guided into the storage container 1 via the jet pump 11.

After the mixing phase the shutoff valve 28 is opened and the partial stream C flows through the density measuring device 27. If the measuring result satisfies the requirements for the foam material, the partial stream C is admitted to the location of utilization 13 via the quantity measuring device 29. In case the measuring result does not satisfy the requirements for the foam material, the partial stream C is introduced into the storage container 1 via the return conduit 30, whereupon further mixing takes place. During the withdrawal of the partial stream C the product stream B is circulated as described earlier.

By means of this process, from a starting product A having a volume of 3.8 $m^3$ and a density between 1500 and 2500 $kg/m^3$, a foam material is produced which, after a mixing phase of 60 seconds, has a density between 100 and 1000 $kg/m^3$ and a uniformly distributed pore structure.

What is claimed is:

1. A method of making foam materials formed essentially of a starting product and a foaming agent in a mixing reactor which is connected by means of a delivery pump with a storage container holding the starting product, said method comprising the steps of:

admitting a product stream, taken from the mixing reactor, while adding the foaming agent and ambient air into a circulating flow via a jet pump, to the storage container which is maintained at a minimum fill level; and after a mixing phase, taking a partial stream of the product stream from the product stream for utilization, where the foaming agent is mixed to the product stream in the jet pump.

2. The method as defined in claim 1, wherein a pressurized gas is mixed to the product stream in the jet pump.

3. The method as defined in claim 1, wherein the quantity of one of the foaming agent and a pressurized gas mixed to the product stream is measured and regulated.

4. The method as defined in claim 1, wherein at least one of the foaming agent and a pressurized gas is advanced to the jet pump by a metering pump through a flow rate meter.

5. The method as defined in claim 1, wherein the partial stream passes through a density measuring device.

6. The method as defined in claim 5, wherein th density of the partial stream is determined volumetrically or gravimetrically.

7. The method as defined in claim 5, wherein the partial stream is, dependent from the result of the density measurement, advanced to the location of utilization or returned to the storage container.

8. An apparatus for making foam materials formed essentially of a starting product and a foaming agent, said apparatus comprising:

a mixing reactor having an inlet, and first and second outlets, at least one static mixing element being arranged inside of said mixing reactor;

a storage container having a fill level, said storage container holding the starting product;

a delivery pump connected between said mixing reactor and said storage container, wherein the inlet of said mixing reactor initially receives starting product pumped from said storage container and said mixing reactor mixes the starting product forming a product stream; and a jet pump connected between the first outlet and said storage container, said jet pump having an inlet for receiving foaming agent, wherein the first outlet of said mixing reactor sends out the product stream to said jet pump, which is introduced into said jet pump and is mixed with the foaming agent in said jet pump, and the resultant product stream exits said jet pump above the fill level of said storage container, and wherein the inlet of said mixing reactor then receives a product stream from the stream from said storage container and the second outlet of said mixing reactor withdraws a partial stream of the product stream to a location of utilization.

9. The apparatus as defined in claim 8, further comprising at least one fine protective screen that is installed within the mixing reactor.

10. The apparatus as defined in claim 9, wherein the fine protective screen is arranged ahead of the first outlet for the product stream, and the first outlet for the product stream is situated at a side of the mixing reactor which is opposite the inlet for the product stream.

11. The apparatus as defined in claim 8, wherein the mixing reactor is connected to an external vibrator.

12. The apparatus as defined in claim 8, wherein said mixing reactor is connected with the storage container by a pipe conduit as well as a hose with the interconnected delivery pump.

13. The apparatus as defined in claim 12, wherein the pipe conduit is provided in its interior with at least one mixing element.

14. The apparatus as defined in claim 8, wherein the jet pump is provided with a second inlet for receiving pressurized gas.

15. The apparatus as defined in claim 14, wherein with the jet pump, there is respectively associated a metering pump for supplying one of the foaming agent and the pressurized gas, and a respective flow rate meter through which the one of the foaming agent and the pressurized gas passes.

16. The apparatus as defined in claim 8, further comprising a connecting conduit with an interconnected density measuring device external of the second outlet for the partial stream.

17. The apparatus as defined in claim 16, wherein the connecting conduit is provided with a quantity measuring device connected after the density measuring device.

18. The apparatus as defined in claim 16, wherein the density measuring device is coupled to a return conduit which leads to the storage container.

19. The apparatus as defined in claim 8, wherein the storage container is covered with a protective screen.

20. The apparatus as defined in claim 8, wherein, with the jet pump for the product stream, a metering jet pump for the partial product stream is associated which supplies one of the foaming agent and a pressurized gas to the partial product stream and subsequently the partial product stream arrives into the mixing reactor.

* * * * *